March 20, 1962  A. B. STAFFORD  3,025,595
AXLE PULLER
Filed Feb. 6, 1958
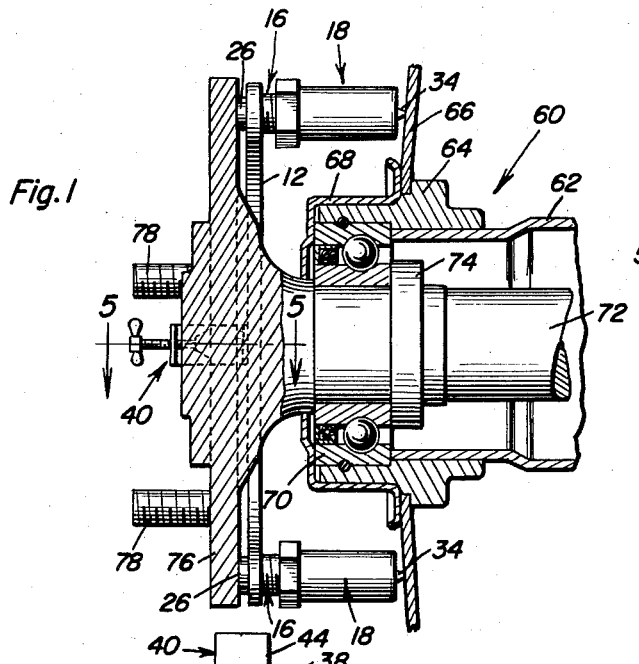
Fig. 1
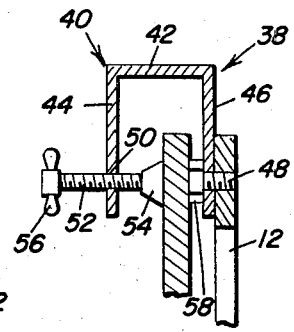
Fig. 5
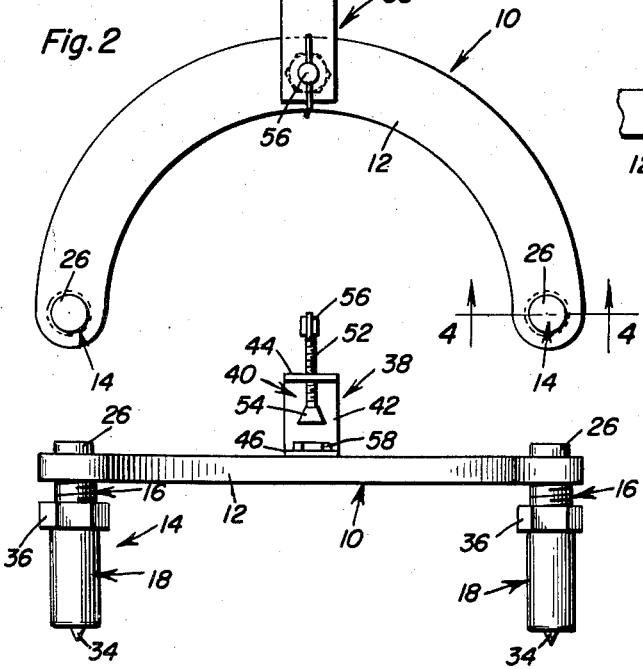
Fig. 2
Fig. 3
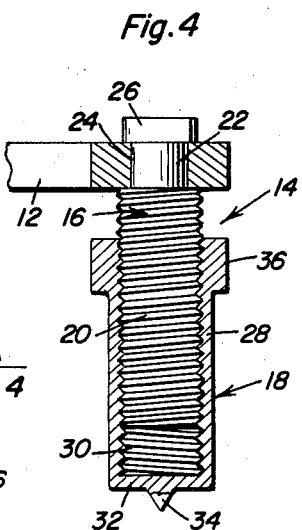
Fig. 4
Alton B. Stafford
INVENTOR.
BY *Clarence A. O'Brien*
*and Harvey B. Jacobson*
Attorneys 3,025,595
AXLE PULLER
Alton B. Stafford, P.O. Box 97, Lexington Ave.,
Vanceburg, Ky.
Filed Feb. 6, 1958, Ser. No. 713,640
3 Claims. (Cl. 29—239)

This invention relates in general to new and useful improvements in tools of the specialized type for automotive work, and more specifically to an improved axle puller.

The rear axles of a majority of the modern day vehicles are so mounted whereby in order to remove them, it is necessary that they be forcibly pulled from the axle housing. This is primarily due to the mounting of bearings on the axle outboard thereof, the bearings being forcibly retained in place. While there have been devised numerous types of axle pullers, those axle pullers which are commercially available are heavy in construction and difficult to operate. This is particularly true in connection with axle pullers of the universal type which may be used in connection with many types of vehicles.

It is therefore the primary object of this invention to provide an axle puller which is of an extremely simple construction and which is light in weight so that it may be readily handled during an axle pulling operation.

Another object of this invention is to provide a simple axle puller, the axle puller, while being simple being of a nature whereby a tremendous force may be applied to the axle so that even those axles which are most firmly retained in place may be easily removed.

Still another object of this invention is to provide an improved axle puller for removing rear axles of vehicles, the axle puller being of an extremely simple construction and formed of readily obtainable materials whereby the manufacture of the axle puller is economically feasible.

A further object of this invention is to provide an improved axle puller for removing rear axles of a type which includes a wheel mounting flange, the axle puller being in the form of an arcuate member which has extending therefrom a plurality of extensible members in the form of screw threaded sections, the extensible members being engageable with a brake backing plate and being used to urge the arcuate member away from the brake backing plate thus forcing the axle out of its housing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a bottom view of the axle puller which is the subject of this invention and shows the axle puller applied to a vehicle axle in position for removing the vehicle axle, the vehicle axle and components of the axle housing being shown in section;

FIGURE 2 is an elevational view of the axle puller and shows the general details thereof;

FIGURE 3 is a bottom view of the axle puller removed from the axle and shows the general details of a clamp for retaining the axle puller on an axle wheel mounting flange;

FIGURE 4 is an enlarged fragmentary sectional view taken substantially upon the plane indicated by the section line 4—4 of FIGURE 2 and shows the specific details of one of the extensible members; and FIGURE 5 is an enlarged fragmentary sectional view taken substantially upon the plane indicated by the section line 5—5 of FIGURE 1 and shows the manner in which the axle puller is releasably clamped to the wheel mounting flange of the axle.

Referring now to the drawings in detail, it will be seen that there is illustrated the axle puller which is the subject of this invention, the axle puller being referred to in general by the reference numeral 10. The axle puller 10 includes an arcuate member 12. The arcuate member 12 may be formed of plate material having a portion thereof cut away forming a recess to receive an axle shaft upon lateral movement of the latter into the recess, the plate material being of sufficient width and thickness so as to resist distortion thereof. Carried by opposite ends of the arcuate member 10 are extensible members which are referred to in general by the reference numeral 14.

As is best shown in FIGURE 4, each of the extensible members 14 includes a first section 16 and a second section 18. The first section 16 is in the form of an elongated screw 20 which has a reduced end portion 22 extending through a bore 24 in the arcuate member 12 and terminating in a button-type head 26 which retains the screw 20 in place.

The section 18 is in the form of an elongated sleeve 28 which is provided with internal threads 30 mating with the threads of the screw 20. The sleeve 28 has one end thereof closed by an end wall 32. The end wall 32 includes a pointed central portion 34 which projects therefrom. The opposite end of the sleeve 28 is in the form of a projecting nut portion 36 to facilitate the turning thereof by means of a wrench. Secured to the central part of the arcuate member 12 is a clamp which is referred to in general by the reference numeral 38. The clamp 38 includes a U-shaped member 40 which is formed of an uppermost web 42 to which there is connected depending flanges 44 and 46. The depending flange 46 is secured to the face of the arcuate member 12 opposite from that from which the extensible members 14 extend by means of a bolt 48. The flange 44 is provided with an internally threaded bore 50 which is aligned with the bolt 48 and which has threadedly engaged therein a shank 52 of a clamp member 54. The shank 52 has on the opposite end thereof a handle 56 to facilitate turning thereof. It is to be noted that the bolt 48 has a head 58 which projects from the arcuate member 42 the same distance as the buttons 26.

Referring now to FIGURE 1 in particular, it will be seen that there is illustrated a rear axle construction which is referred to in general by the reference numeral 60. The rear axle construction 60 includes a rear axle housing 62 which terminates in an end fitting 64. The end fitting 64 has mounted thereon a brake backing plate 66. The backing plate 66 is held in place by means of bolts (not shown) which also retain in place a bearing retainer 68.

Mounted in the end 64 is an outboard bearing 70 for a rear axle 72. The bearing 70 is held on the axle 72 by means of a suitable collar 74 and is normally retained in the end fitting 64 by the bearing retainer 68. It is to be understood that the bearing 70 for all purposes has a drive fit in the end fitting 64.

The axle 72 also includes an outboard wheel mounting flange 76. Extending outwardly from the flange 76 is a plurality of wheel mounting studs 78.

In order to remove the axle 72, it is necessary that the bolt (not shown) holding the bearing retainer 68 in place be removed. Once this has been accomplished, then it is required that pressure be applied to the axle 72 to move it to the left, the pressure to be applied having to be sufficient to pull the bearing 70. The axle puller 10 is designed for this purpose.

As is best shown in FIGURE 1, the axle puller 10 is placed on the axle 72 by positioning the arcuate member 12 inboard of the wheel mounting flange 76 and by securing the arcuate member 12 to the wheel mounting flange 76 by means of the clamp 38. This is best shown in FIGURE 5. Once this has been accomplished, then the sections 18 are rotated until the pointed ends 34 engage the backing plate 66. Continued rotation of the sections 18 result in the buttons 26 and the head 58 of the bolt 48 firmly bearing against the inboard side of the wheel mounting flange 76. Then as the sections 18 are further turned, because of the pressure built up, the arcuate member 12 will be forced to the left, as viewed in FIGURE 1. As the arcuate member 12 moves to the left, the axle 72 will be moved to the left thus pulling the bearing 70. Continued turning of the sections 18 will result in the releasing of the bearing 70 after which the axle 72 may be manually pulled the rest of the way from the axle housing 62.

The axle puller 10 is designed primarily for use in conjunction with the recently built Chevrolet vehicles. However, the axle puller may be used with other model vehicles. It will be readily apparent that the axle puller 10 is light in weight and may be easily handled. Also, it may be easily operated and the pressures exerted therewith depend only upon the strength of the threads of the screw 20 and the sleeve 28 and the operator turning the sections 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with vehicles having an axle housing with a backing plate mounted on the outboard end thereof and an axle shaft journaled therein and extending outwardly therefrom with a wheel mounting flange on the outer end of the axle shaft; an axle puller comprising a plate member having a portion thereof cut away so as to form a recess of sufficient size and shape adapted to at least half way encircle said axle shaft and engage the inner face of said wheel mounting flange, a plurality of extendable elements carried by and extending laterally from one side of said plate member and adapted to engage the confronting outer surface of said backing plate whereby said extendable elements may be extended to urge said wheel mounting flange and said axle secured thereto outwardly of said backing plate, said extendable elements each including telescoped screw threaded sections, one section of each of said extendable elements being secured to said plate member and having an axle flange engaging projection projecting from the other side of said plate member.

2. For use with vehicles having an axle housing with a backing plate mounted on the outboard end thereof and an axle shaft journaled therein and extending outwardly therefrom with a wheel mounting flange on the outer end of the axle shaft; an axle puller comprising a plate member having a portion thereof cut away so as to form a recess of sufficient size and shape adapted to at least half way encircle said axle shaft and engage the inner face of said wheel mounting flange, a plurality of extendable elements carried by and extending laterally from one side of said plate member and adapted to engage the confronting outer surface of said backing plate whereby said extendable elements may be extended to urge said wheel mounting flange and said axle secured thereto outwardly of said backing plate, said extendable elements each including telescoped screw threaded sections, one section of each of said extendable elements being secured to said plate member and having an axle flange engaging projection projecting from the other side of said plate member, the other section of each of said extendable elements terminating in a backing plate engaging point.

3. For use with vehicles having an axle housing with a backing plate mounted on the outboard end thereof and an axle shaft journaled therein and extending outwardly therefrom with a wheel mounting flange on the outer end of said axle shaft; an axle puller comprising a plate member having a portion thereof cut away so as to form a C-shaped member sufficient in size and shape adapted to at least half way encircle said axle shaft and engage the inner face of said wheel mounting flange, a pair of extendable elements carried by and extending laterally from one side of said plate member and adapted to engage the confronting outer surface of said backing plate whereby said extendable elements may be extended to urge said wheel mounting flange and said axle secured thereto outwardly of said backing plate, said pair of extendable elements being disposed on said plate member so as to be diametrically opposed to the axis of rotation of said axle shaft, a clamp carried by said C-shaped member intermediate said extendable elements adapted to clampingly engage an adjacent portion of the periphery of said wheel mounting flange.

References Cited in the file of this patent

UNITED STATES PATENTS

| | | |
|---|---|---|
| 282,828 | Worswick | Aug. 7, 1883 |
| 1,310,806 | Rollins | July 22, 1919 |
| 1,930,690 | Oelkers | Oct. 17, 1933 |
| 2,160,395 | Wettlaufer | May 30, 1939 |